United States Patent Office 3,191,736
Patented June 29, 1965

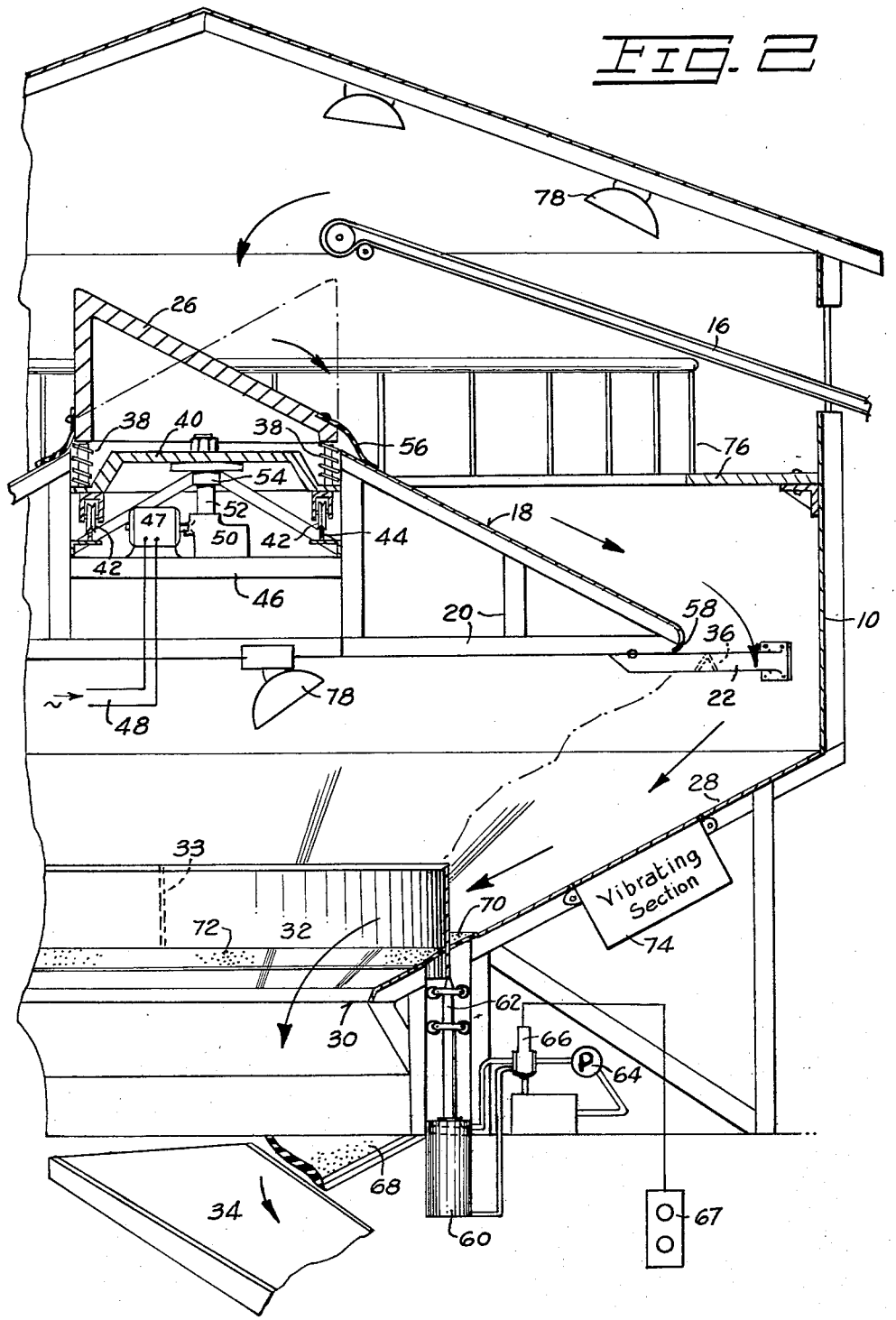

3,191,736
REVOLVING SLIDE AND CONE STORAGE HOPPER
Willard S. Conlon, 332 Leesburg Pike, Apt. 402,
Falls Church, Va.
Filed Jan. 9, 1964, Ser. No. 336,821
4 Claims. (Cl. 193—1)

This invention pertains to apparatus for the handling, storage and delivery of packages, parcels, bags and similar objects. It is especially directed to the handling of such articles of mixed or miscellaneous sizes, for example in the distribution preliminary to a sorting operation of accumulations of packages or parcels to be distributed to various locations or addresses. However, as will appear, the apparatus is adapted also for other applications, and variety of sizes and shapes is not a necessary feature of situation in which it can perform its intended functions.

Basically, the invention aims to provide a storage and dispensing apparatus of maximum capacity and adequate speed of operation, with a minimum capital investment or installation cost, and a very low power requirement and maintenance expense. One of the difficult problems of systems of this general type has been the necessity for using human labor to maintain an orderly flow of articles or packages from one or more supply inputs, such as chutes, belt conveyors, and the like, to the subsidiary sorting or distribution point. The rates of supply are of course highly variable, as during car unloading operations, and it is necessary to provide extensive interim storage volume in order to allow such articles to be delivered to the next stage of the over-all operation at a rate suitable to the sorting or other handling procedures. A typical example, to which the invention is not, however, restricted, is in the handling of parcel post packages or bagged mail at a large post office installation. The expenditious handling of such incoming material, with a minimum of labor and possibility of damage to the articles, has so far not been accomplished in a satisfactory manner.

In general, I achieve the objects of my invention by means of a mechanical storage hopper, preferably of cylindrical form with a vertical central axis, and within which is fixedly mounted a shallow conical slide with its stationary axis centered on the same central axis as the hopper. The slide is actually frusto-conical, and within its hollow cut-off upper termimus is rotatably mounted an inclined deflector in the form of an angularly truncated vlinder whose flat, inclined upper face thus faces successively in the various lateral directions about the central axis. This upper face of the deflector receives from above, by gravity fall from slides, belts or the like, the incoming supply of packages, bags or parcels, and continuously distributes them purely by gravity onto the conical fixed slide and thence they slide to the outer rim of the latter. The diameter of the slide is sufficiently smaller than the inside diameter of the hopper to allow even the largest package to drop onto the likewise shallow, conical floor of the hopper, downwardly inclined toward the central axis of the hopper, which is surrounded by an exit aperture.

In order to control the outflow from the hopper, by gravity discharge through the exit aperture, I provide a cylindrical gate or valve centered on the central axis and movable in the vertical direction between an uppermost location in which it constitutes a cylindrical wall surrounding the aperture, and a lowermost location in which its upper edge is flush with the conical slide's upper inclined surface. In the latter position, the exit aperture is entirely unobstructed, and packages, bags or articles slide freely into the exit aperture, and onto a sorting table or the like. By raising the valve, its wall impedes the outflow passage, and articles will be restrained to form a dam for other articles sliding down the surface of the fixed conical slide, so that the entire volume of the storage hopper is available for interim storage of such material. The vertical motion of the valve, or of any selected portion thereof in the case of a divided valve, is preferably obtained under electro-hydraulic force controlled from a point near the outflow of the hopper, as by means of a manual pushbutton station.

With the above general description in mind, the invention will best be understood by referring now to the following detailed description of a preferred structural embodiment thereof, taken in connection with the appended drawings, in which:

FIGURE 2 is a vertical sectional view of slightly more than one half of the apparatus of FIGURE 1, with a diagrammatic showing of the power and control equipment.

Figure 1:
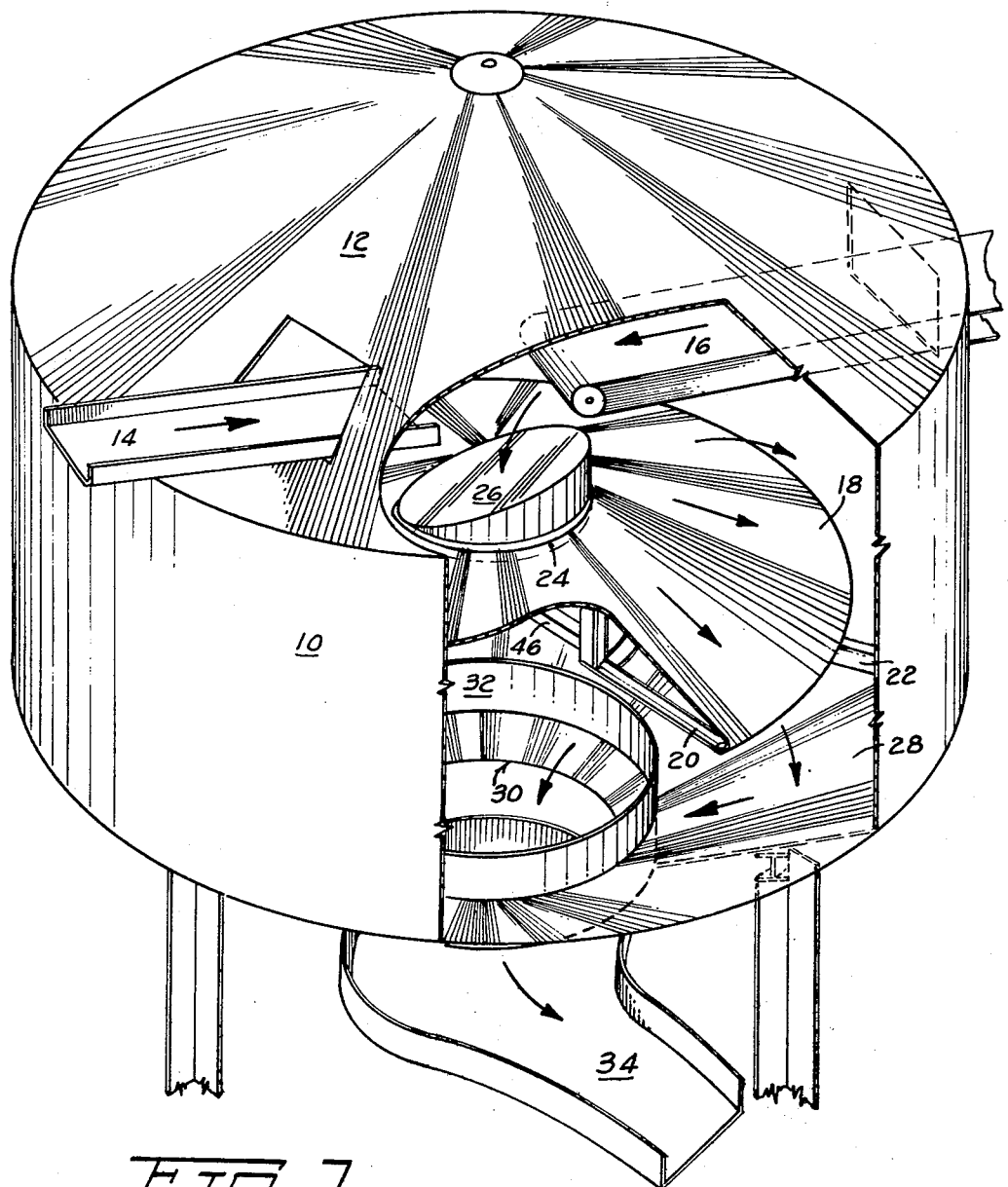
FIGURE 1 is a perspective view, partly broken away, of such an apparatus.

Referring first to FIG. 1 of the drawings, reference numeral 10 designates the cylindrical outer hopper of the equipment, which may be a building in its own right, but more generally will be a simple sheet-metal silo or the like constructed within or atop an existing building. Where a roof is required, a conical sheet metal one as at 12 may be provided, in which case the packages or articles received will arrive as on slides such as 14 or belt conveyors such as 16 passing through suitable apertures in the roof and terminating with their discharge ends near the central axis of the hopper.

Within the hopper 10 is fixedly mounted the conical inclined slide 18, supported on a suitable framework 20 and carried by the wall structure of the hopper 10 by radial girders 22 or upon vertical feet, in either case so spaced about the periphery as not to impede the articles dropping off the peripheral rim of the slide. Such members are shaped (for example, as inverted V's in crosssection, see numeral 36 in FIG. 2, or rounded) so as to mimize obstruction to articles which may slide directly onto them, and are preferably covered with rubber or other resilient material to obviate danger to such articles. At the upper terminus of the slide, its conical surface is truncated as at 24, providing an opening within which is mounted the rotating deflector 26, the region of intersection being guarded by a flexible seal to be detailed below. The deflector 26 is of vertical cylindrical shape, but is cut off at an angle, suitably the same horizontal angle as the slant of the surface of the conical slide 18. Deflector 26 is constantly rotated at a slow rate, whenever the equipment is in use, by means also to be described below, to distribute the material as described above. Such mechanism is preferably completely shrouded by the body of the slide 18, and may be powered and controlled by an electric circuit.

The floor of the hopper 10 is indicated as a downwardly inclined conical surface 28, also of sheet metal, which extends from the periphery of the hopper to the central aperture whose rim is indicated by numeral 30. A valve or gate for the exit aperture is indicated at 32 as a verticalwall cylinder which intersects the floor surface 28 in a horizontal plane preferably upward from the aperture rim 30, and is arranged for vertical movement so as to constitute a circular wall or dam of variable height, over which articles can slide or tumble into the discharge aperture, and fall to the next stage of the handling operation, here indicated by way of example as a chute 34. In its lowermost position, the gate's upper peripheral rim is flush with the slanting floor surface 28, whose edges at the region of intersection are provided with flexible flaps or seals as will be described further below.

The slant angle of slide 18 and floor surface 28 are such as to provide sure yet safe descent under the influence of gravity alone, an angle of 28 degrees relative to horizontal being suitable. The relationship of the diameter of the slide to the inner diameter of the hopper is fixed in accordance with the general range of sizes of articles being handled, as is the vertical distance from the rim of the slide to the floor surface 28. The later should be so chosen as not to involve an excessive drop for weighty or fragile packages when the hopper is nearly empty. It will be observed that when the valve or gate 32 is raised, it need not completely occlude the space beneath slide 18, as packages of random sizes will build up behind the gate, allowing the entire hopper utimately to be filled with the material to a maximum extent, considering the necessity for free flow when the gate has been lowered.

It will be noted that the only power requirements for the apparatus are those involved with the slow rotation of reflector 26 and the raising and lowering of valve 32. It is never necessary to rotate or otherwise propel the bulk of the stored articles in order to fill the hopper, or in order to dispense the articles in an orderly way from the exit.

Referring now to FIG. 2 of the drawings, the parts already described are designated by the same numerals as above. The truncated cylindrical deflector 26 is carried around its lower rim upon spirial cushioning springs 38 in turn spaced about the periphery of a turntable 40 carrying suspended anti-friction rollers 42 engaging a circular monorail 44 supported by beam structure 46. An electric drive motor 47 energized over circuit conductors 48, is carried by the same beam structure 46 and drives the table at a suitable rate such as one revolution per minute, through reduction gearing 50 and main shaft 52 passing through fixed upper bearing 54.

Around its periphery, deflector 26 carries a flexible annular sealing ring 56 of sheet metal, rubber or the like, to allow articles to slide onto conical slide 18 with no danger of loss or damage, and to minimize the need for close tolerances. At the outer rim of slide 18, its sheet metal body is turned under, as at 58, also to avoid entangling the edges or wrappings of boxes, or the material forming the bags.

It will be observed that all of the deflector rotating machinery is contained within the conical shroud formed by slide 18, utilizing no additional space to the detriment of maximum transient storage volume. Since deflector 26 will be desired to rotate whenever the apparatus is in use, the motor supply circuit 48 is preferably merely connected in parallel with the circuit powering the motor drive of any associated input conveyor such as 16 described above.

The outlet control gate or valve 32 is typically powered for vertical adjustments by several hydraulic cylinders 60 whose vertical piston rods are connected to anti-friction carriages 62 which are secured to the lower edge of the gate. Where the valve is a single cylinder, at least two such hydraulic drives are provided to balance the load and avoid binding, all powered from a common source such as oil pump 64, having a solenoid controlled four-way valve 66 and push-button "Up-Down" control station 67, all as well understood by those familiar with such control systems. Where the valve 32 comprises two or more sections divided as at 33 for selective discharge, one or more hydraulic cylinder systems will be used for each, with individual control stations 67 and a common pressure fluid pump. Numeral 68 indicates schematically a fixed resilient-surface deflector beneath a portion of the outlet, permitting articles falling through a selectively-opened valve section to be directed to a particular one of several alternate chutes, sorting tables or the like.

The continuation of the conical surface of floor 28 inwardly past the line of intersection of valve 32 allows the exit aperture to be completely free from obstruction by the valve-operating mechanisms 60, 62 et cetera, or equivalent power means that may be provided in lieu thereof. The numerals 70, 72 designate flexible seals secured about the gap in floor 18 where valve 32 travels through it, again to avoid danger of interference with or loss of small packages, wrappings or the like, as well as to minimize the clearance tolerances between the floor and the valve.

If desired, the floor 28 and/or the slide 18 may be provided at spaced sections with conventional vibrator devices 74, to minimize any restraints that static friction might otherwise impose in connection with a particular installation or the handling of particular kinds of articles or merchandise. For example, where overall height of the installation (and hence the conical sliding angles) are limited, such vibrators allow shallower slide angles to be employed.

Many obvious features of construction are indicated in the drawings without detailed description, as they are not directly related to the invention claimed. Such are the catwalk 76 (for inspection and supervision), lamps 78, fire extinguisher and ventilating devices, and the like. Certain of these will be employed in the larger installations. Typical and suitable dimensions of a small installation are:

|  | Feet |
|---|---|
| Inner diameter of hopper 10 | 28 |
| Inner diameter of exit 30 | 7 |
| Diameter of gate 32 | 11 |
| Body height of hopper 10 | 11 |
| Overall height | 23 |
| Maximum height of top of valve 32 above floor 28 | 4 |
| Outer diameter of slide 18 | 22 |
| Diameter of deflector 26 | 7 |

While the invention has been described herein in considerable detail in order to enable those skilled in the art to understand and practice the same, various modifications in details can be made without departing from the scope of the invention as defined in the appended claims.

I claim:

1. Apparatus for the storage and controlled gravity delivery of articles, comprising a cylindrical housing having its central axis vertical, a shallow conical floor defining a downwardly-inclined surface extending from the periphery of said housing to a central exit aperture, vertically adjustable gate means concentric with said axis and intersecting said floor about said exit aperture, a shallow conical slide partition centered on said axis above said floor and forming a downwardly-inclined surface extending from an upper region near said axis toward the inner periphery of said housing to define between its edge and said housing an annular gap for the passage of articles, and rotating article-deflecting means mounted at the upper center of said slide partition to distribute articles falling thereon in paths distributed radially about said axis.

2. Apparatus in accordance with claim 1, in which said article-deflecting means comprises a cylindrical element projecting upward through a central opening in said partition, and having an inclined upped end surface.

3. Apparatus in accordance with claim 1, and power means for raising and lowering said gate means.

4. Apparatus in accordance with claim 1, and power means for rotating said article-deflecting means.

References Cited by the Examiner

UNITED STATES PATENTS

| 992,910 | 5/11 | Schwab | 193—1 |
| 2,634,842 | 4/53 | Caylor | 193—32 |

SAMUEL F. COLEMAN, *Primary Examiner.*